United States Patent Office 2,986,261
Patented May 30, 1961

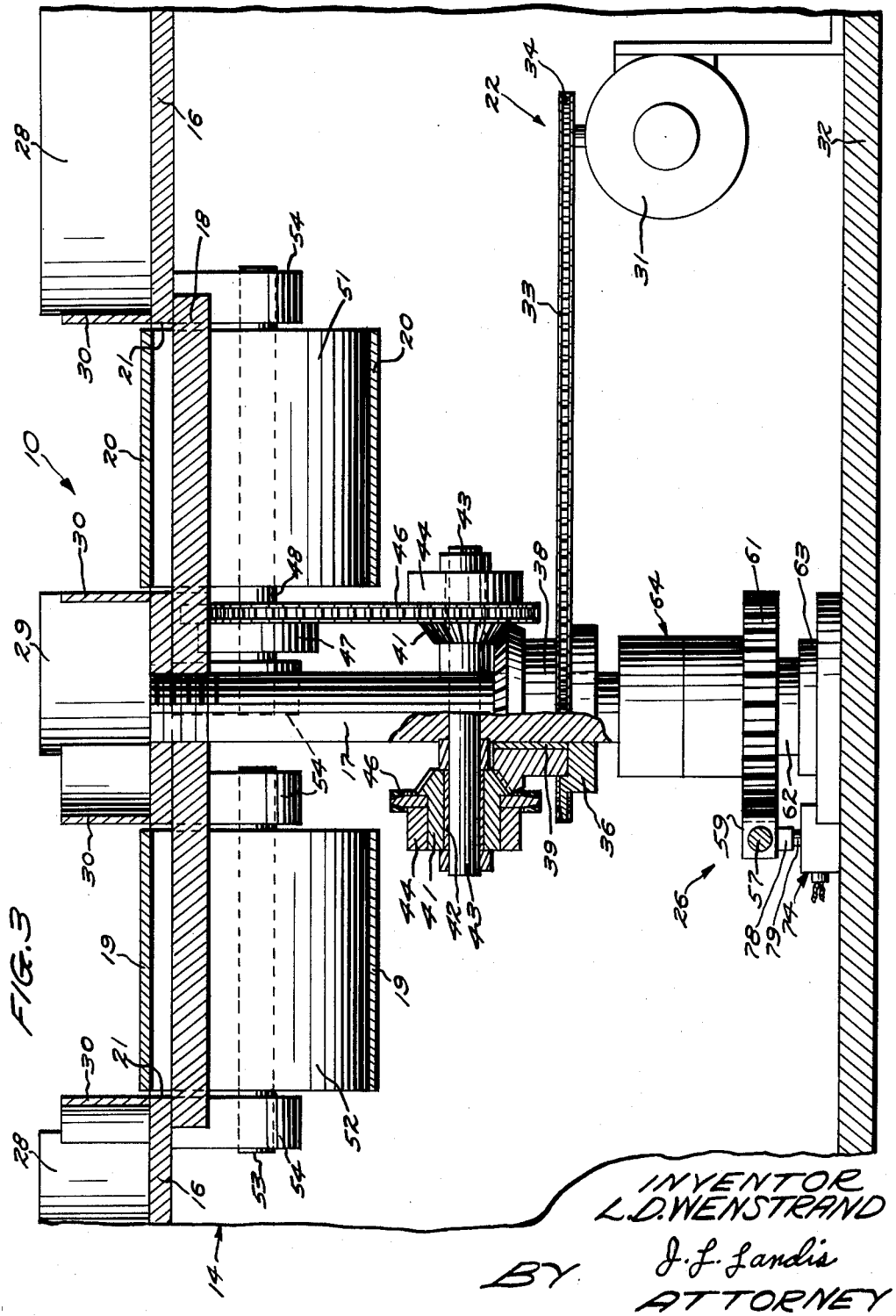

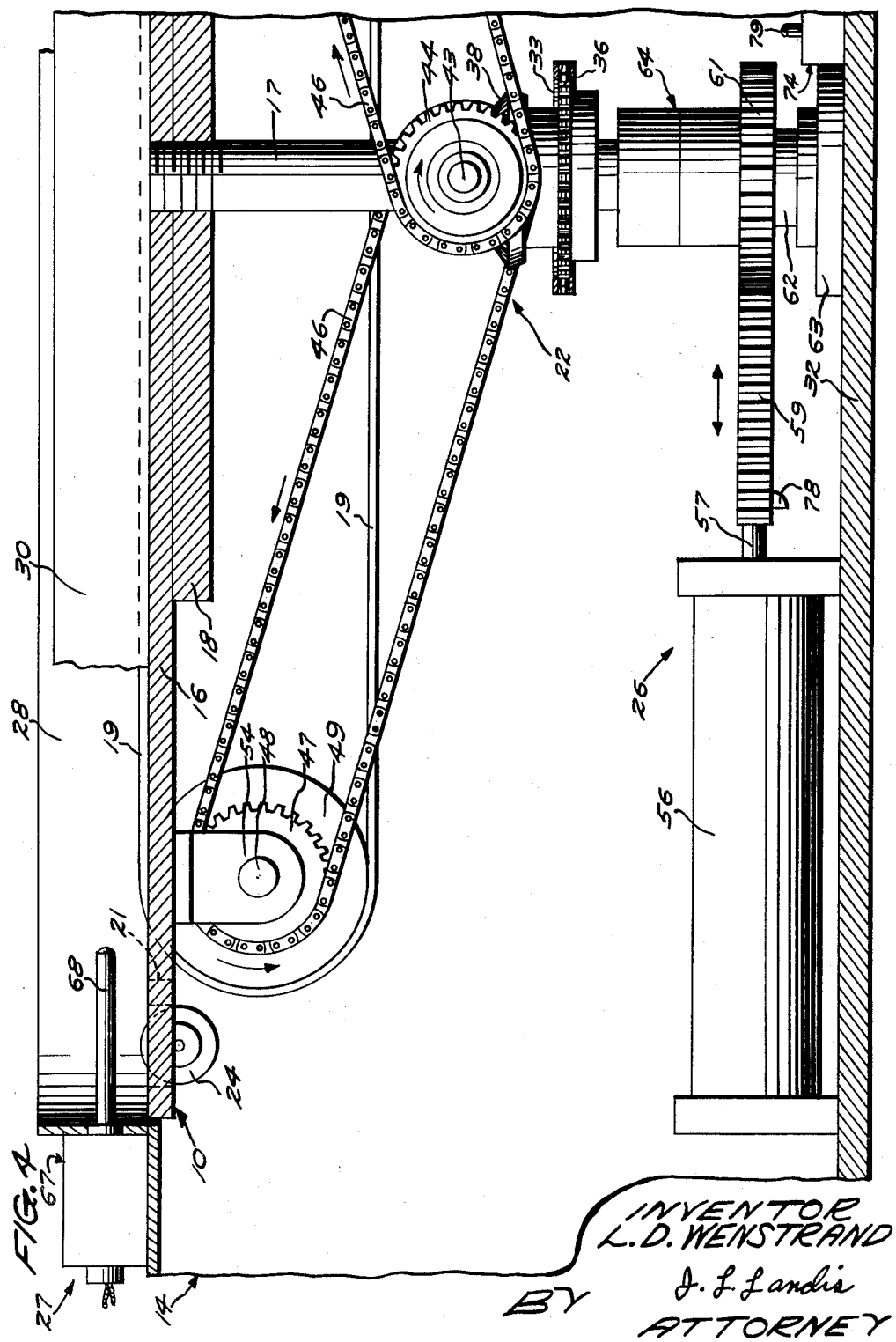

2,986,261

APPARATUS FOR TRANSFERRING ARTICLES FROM AN ARTICLE-FEEDING DEVICE TO AN ARTICLE-RECEIVING DEVICE

Lynn D. Wenstrand, Council Bluffs, Iowa, assignor to Western Electric Company, Incorporated, New York, N.Y., a corporation of New York Filed Dec. 21, 1959, Ser. No. 860,995

7 Claims. (Cl. 198—21)

The present invention relates generally to apparatus for transferring articles from an article-feeding device to an article-receiving device, and more particularly to apparatus for automatically transferring a succession of articles from a first main conveyor belt to a second main conveyor belt mounted parallel to the first and running in the opposite direction thereto.

Accordingly, the general object of the invention is to provide new and improved apparatus for transferring articles from an article-feeding device to an article-receiving device.

A more specific object of the invention is to provide new and improved apparatus for transfering articles from one conveyor to another.

Another object of the invention is to provide new and improved apparatus for automatically transferring a succession of articles from a first main conveyor belt to a second main conveyor belt mounted parallel to the first and running in the opposite direction thereto.

In the manufacture of multicomponent articles wherein a large number of operations are to be performed in succession along an assembly line, and particularly in the assembly of switch units for crossbar frames in the telephone industry, it is desirable to load the articles in preliminary form on a receiving end of a first main conveyor belt of substantial length. For example, the first main conveyor belt may run the length of a room, with a number of operating stations being provided at intervals along the length thereof. Each article on the conveyor is automatically pushed from the conveyor belt at one operating station of each particular type, the indicated operation is performed on the article, and then the article is returned to the conveyor belt for conveyance to a subsequent operating station of a different type.

Where there is a large number of operations to be performed on the articles, it is desirable to provide a second main conveyor belt of the same length as the first running close to and parallel to the first in the opposite direction thereto in order to conserve space and provide a compact assembly line. With this arrangement, the loading and unloading operations are facilitated since the completed articles are discharged from the second main conveyor belt in the same general area in which the articles in preliminary form were loaded onto the first main conveyor belt.

Accordingly, another object of the invention is to provide new and improved apparatus for automatically transferring a succession of crossbar switch units in the process of assembly from a first main conveyor belt to a second main conveyor belt mounted in close parallelism with the first and running in the opposite direction thereto.

The foregoing and other objects are accomplished, according to certain features of the invention, by providing a normally stationary turntable mounted adjacent to both a discharge end of an article-feeding device, as a first main conveyor, and a receiving end of an article-receiving device, as a second main conveyor, to which an article on the first main conveyor is to be transferred. A conveyor belt is mounted on the turntable in alignment with the discharge end of the article-feeding device, and means are provided for driving the conveyor belt so that the upper run thereof travels in such direction as to receive an article from the article-feeding device. In order to effect a transfer, means are provided, responsive to the presence of an article on the conveyor belt, for rotating the turntable through a predetermined angle designed to align the conveyor belt with the receiving end of the article-receiving device with the upper run of the conveyor belt traveling in such direction as to transfer the article from the conveyor belt to the article-receiving device.

Preferably, the feeding and receiving devices comprise two main conveyor belts mounted parallel to each other and running in opposite directions. In this instance, there are provided two auxiliary conveyor belts which are mounted symmetrically on the turntable, one in alignment with each of the main conveyor belts so as to receive and discharge articles. The turntable is automatically rotated through an angle of 180° each time an article passes onto the auixiliary belt which is at the time aligned with the first main conveyor. The rotation of the turntable is preferably initiated by a stationary switch having an actuator disposed in the path traversed by an article on the aligned auxiliary conveyor belt, such that the article strikes the switch to set in motion the drive means for rotating the turntable. It is also preferred to utilize a guard member adjacent to the turntable for retaining the article on the auxiliary conveyor belt during the rotation of the turntable. It is also desirable to arrange the drive mechanisms so that the rotation of the turntable slows down the auxiliary conveyor belts.

Other objects, advantages and features of the invention will appear from the following detailed description of a specific embodiment thereof, when read in conjunction with the appended drawings, in which:

Fig. 3 is a fragmentary vertical section through the assembly illustrated in Fig. 2, taken generally along the line 3—3 of Fig. 2 in the direction of the arrows and having portions broken away to illustrate details of construction;

Fig. 4 is a fragmentary vertical section through the assembly illustrated in Fig. 2, taken generally along the line 4—4 in Fig. 2 in the direction of the arrows and having portions broken away for clarity; and Fig. 5 is a schematic diagram of an electrical control circuit in accordance with the invention.

Figure 1:
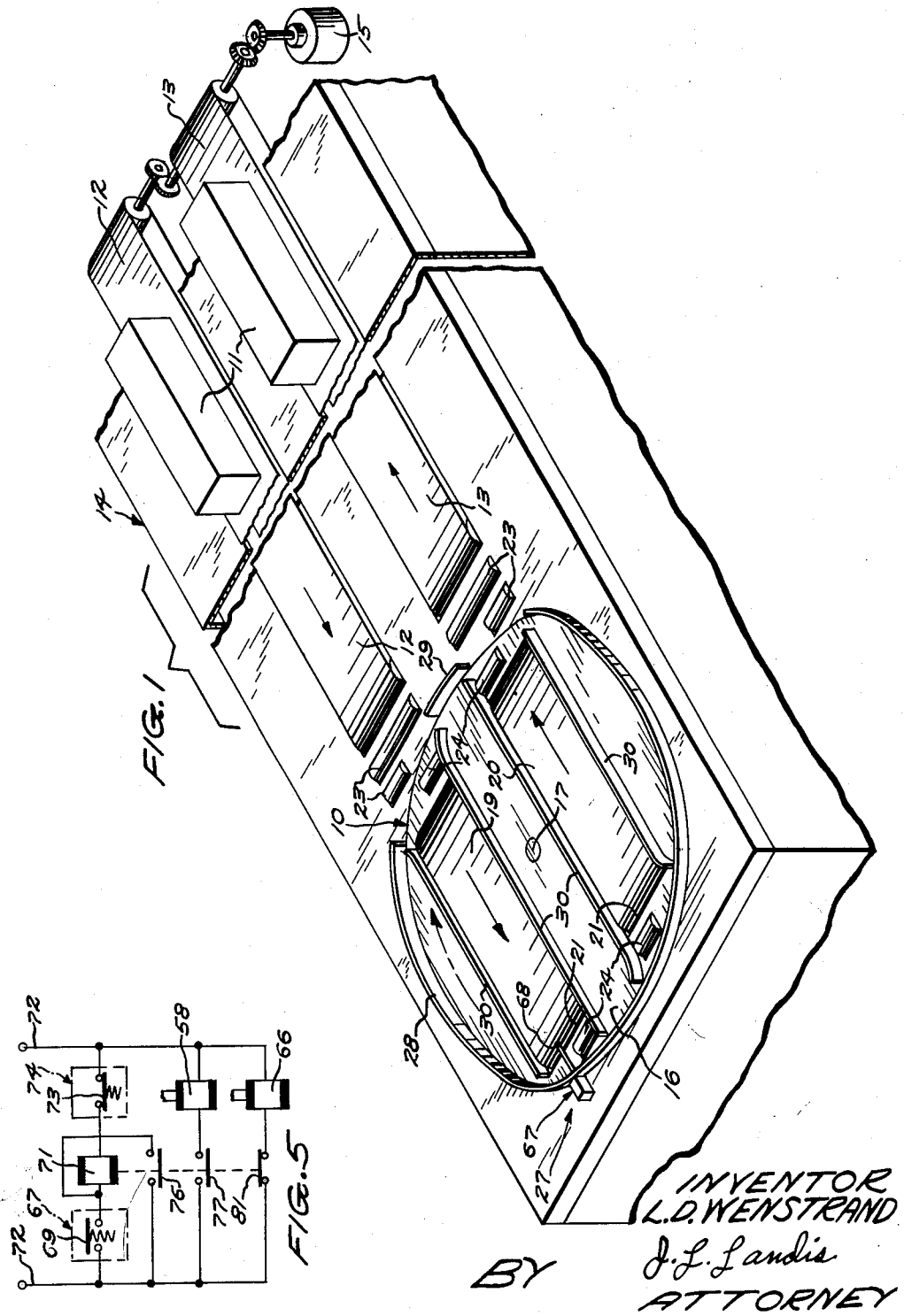
Fig. 1 is a fragmentary perspective view of an assembly line with two main conveyors, including a turntable assembly illustrative of the present invention for transferring articles from one conveyor to the other.
Figure 2:
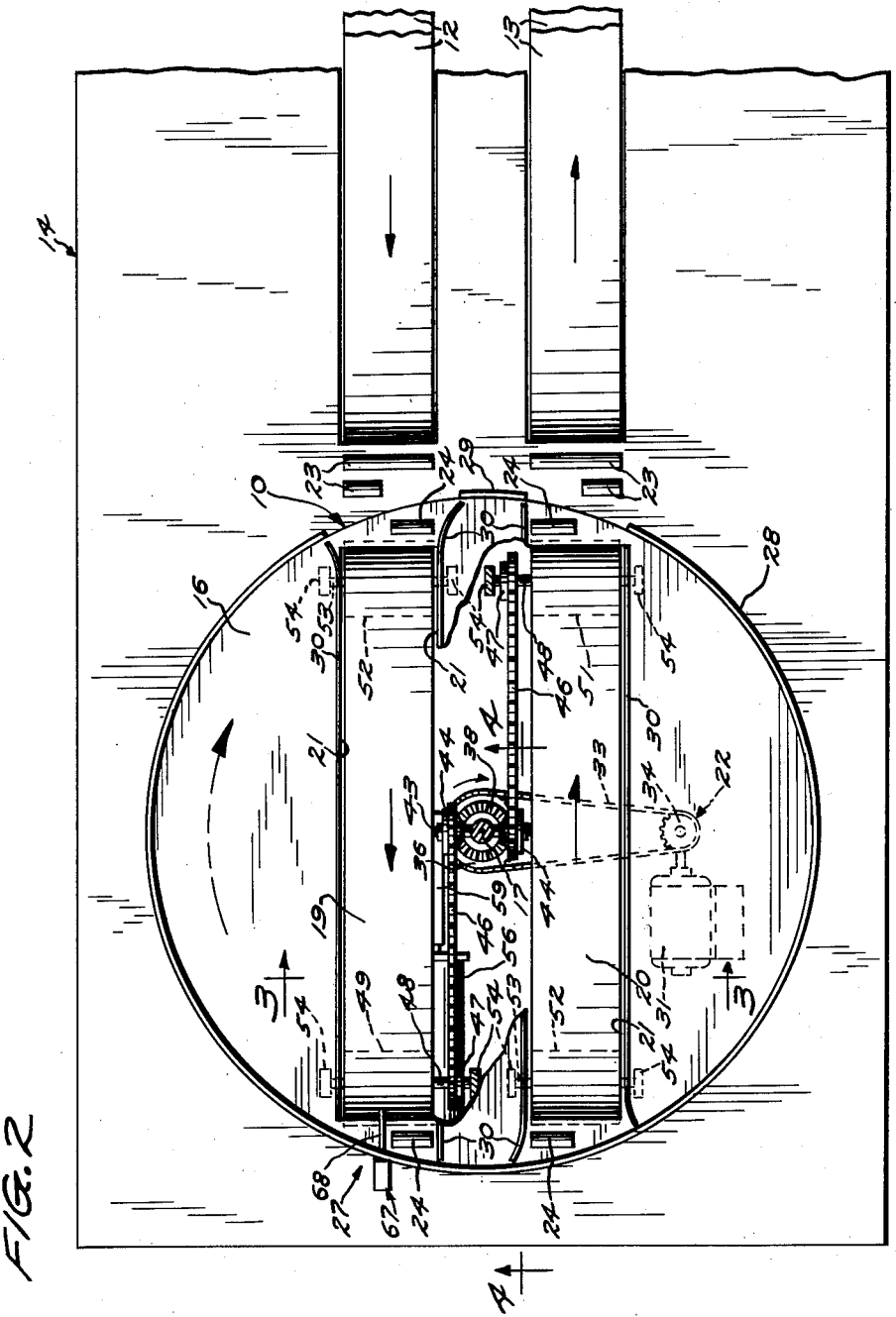
Fig. 2 is a plan view of the turntable assembly illustrated in Fig. 1, with portions broken away to reveal structural details.

Referring now in detail to the drawings and in particular to Figs. 1 and 2, the invention relates to a turntable assembly designated generally by the numeral 10 for transferring a succession of articles 11—11, such as partially assembled crossbar switches, from a first main conveyor belt 12 (the article-feeding device) to a second main conveyor belt 13 (the article-receiving device) mounted parallel to the first. The main conveyor belts 12 and 13 are mounted for endless movement, in conventional fashion, on a supporting table designated generally by the numeral 14 and are driven in opposite directions from a suitable drive motor 15. The upper, or operating runs, of the conveyor belts 12 and 13 extend slightly above the upper surface of the table 14.

It should be understood that the table 14 and the belts 12 and 13 may extend along substantially the entire length of a room and that a plurality of operating stations are located on both sides of the table 14 at intervals along the length thereof for performing diverse assembly operations. The articles 11—11 are loaded onto the upper belt 12 and are removed from the lower belt 13 at the right end of the table 14, as viewed in Fig. 1, and are transferred from the belt 12 to the belt 13 by the turntable assembly 10 at the left end of the table 14.

The turntable assembly 10 includes a horizontal, normally stationary turntable 16 mounted for rotation within the supporting table 14 adjacent to both the discharge or left end of the first main conveyor belt 12 and the receiving or left end of the second main conveyor belt 13, as shown in Figs. 1 and 2. The turntable 16 is secured at the upper end of a shaft 17 (Figs. 3 and 4) for rotation therewith, and a horizontal supporting plate 18 is secured to the shaft 17 and portions of the under surface of the turntable 16 to provide additional support for the turntable.

A pair of auxiliary conveyor belts 19 and 20 are mounted symmetrically on the turntable, one in alignment with each of the main conveyor belts 12 and 13 as illustrated in Figs. 1 and 2. The belts 19 and 20 are received within rectangular apertures 21—21 in the turntable 16, and the supporting plate 18 passes between the runs of the belts 19 and 20 as shown in Fig. 3.

Means are provided, designated generally by the numeral 22 and best illustrated in Figs. 2, 3 and 4, for driving the auxiliary conveyor belts 19 and 20 so that the upper runs thereof travel in the same directions as the upper runs of the main conveyor belts 12 and 13 aligned therewith. With this construction, an article travelling along the first main conveyor belt 12 passes onto a first one of the auxiliary conveyor belts 19 or 20 on the turntable 16. As viewed in Figs. 1 and 2, the next article 11 to approach the turntable 16 will pass from the main conveyor belt 12 onto the auxiliary conveyor belt 19 since the belt 19 is shown aligned with the belt 12. By the time that the following article 11 approaches, the turntable 16 will have been rotated through an angle of 180° so that the belt 20 is aligned with the belt 12 to receive that article.

The auxiliary belts 19 and 20 are so mounted on the turntable 16 that the upper surfaces thereof are in horizontal alignment with the upper surfaces of the belts 12 and 13 to permit ready passage of the articles 11—11 from the first main conveyor belt 12 to the auxiliary conveyor belts 19 and 20, and from the auxiliary conveyor belts 19 and 20 to the second main conveyor belt 13. A pair of idler rolls 23—23 are rotatably journalled in the supporting table 14 between each of the main conveyors 12 and 13 and the turntable 16, and a short idler roll 24 is rotatably mounted in the turntable 16 on either side of each of the auxiliary conveyor belts 19 and 20. These idler rolls facilitate the passage of the articles 11—11 to and from the turntable 16.

Means are provided, designated generally by the numeral 26 and best illustrated in Figs. 3 and 4, for rotating the turntable through an angle of 180° each time an article 11 has been received on one of the auxiliary conveyor belts 19 or 20 so that the operative auxiliary belt will be moved to the position where it aligns with the second main conveyor belt 13, and the article 11 will then travel from the operative auxiliary belt onto the belt 13.

Preferably the turntable 16 is rotated in a clockwise direction, as viewed in Figs. 1 and 2, each time an article 11 is to be transferred, although it should be understood that it would be possible to rotate the turntable in a counterclockwise direction or to rotate the turntable alternately clockwise and counterclockwise.

Switching means, designated generally by the numeral 27 and best illustrated in Figs. 2 and 4, are provided for sensing the presence of an article 11 on the auxiliary conveyor belt 19 or 20 which is then aligned with the first main conveyor belt 12 for initiating the operation of the turntable-rotating means 26. With this provision, a continuous succession of the articles 11—11 may be transferred automatically from the belt 12 to the belt 13.

An arcuate guard rail 28 is provided, projecting upward from the surface of the supporting table 14 adjacent to a portion of the outer periphery of the turntable 16 so as to abut the articles 11—11 and retain them on the auxiliary conveyor belts 19 and 20 until those belts have been moved 180° into alignment with the second main conveyor belt 13. As viewed in Figs. 1 and 2, the rail 28 comprises a C-shaped rim which terminates at a position approximately in alignment with the lower edge of the conveyor belt 13. A small guard rail 29 is also positioned between the main conveyor belts 12 and 13. It is also desirable to provide a pair of upstanding guide rails 30—30 on opposite sides of each of the auxiliary conveyor belts 19 and 20 so as to guide the articles 11—11 onto and off of the auxiliary belts and to retain the articles on the auxiliary belts during the transfer operation.

The means 22 for driving the auxiliary conveyor belts 19 and 20 includes a drive motor 31 (Figs. 2 and 3) secured to a lower platform 32 forming a part of the table 14. The motor 31 drives a chain 33 that meshes with a sprocket 34 on the output shaft thereof. The chain 33 in turn drives a sprocket 36 that is rotatably journalled about the turntable shaft 17. An annular bevel gear 38 is secured to the upper surface of the sprocket 36, as illustrated in Fig. 3, for rotation therewith about the shaft 17. A bushing 39 is interposed between the gear 38 and the shaft 17 to permit free rotation of the gear 38 and the sprocket 36.

The bevel gear 38 meshes with each of a pair of secondary bevel gears 41—41 positioned one on either side of the shaft 17 so that these gears are rotated in opposite directions to each other. The gears 41—41 are mounted on a pair of bushings 42—42, one of which is illustrated in Fig. 3, for free rotation about the opposite ends of a pin 43 that is secured to the shaft 17 and projects outward on either side thereof to receive the gears 41—41. An annular sprocket 44 is secured about each of the bevel gears 41—41 for rotation therewith, and each of the sprockets 44—44 drives a chain 46 passing therearound. Each of the chains 46—46 in turn passes about a second sprocket 47, as best seen in Figs. 2 and 4, which is keyed to a drive shaft 48 for one of the auxiliary conveyors 19 and 20.

As viewed in Fig. 2, the drive shaft 48 at the upper-left rotates a driving roll 49 at the left end of the auxiliary conveyor belt 19 to drive the belt 19 so that the upper run thereof travels from right to left. Correspondingly, the drive shaft 48 at the lower-right of Fig. 2 rotates a driving roll 51 at the right end of the auxiliary conveyor belt 20 so that the upper run of that belt travels from left to right. When the turntable 16 has been rotated 180°, the assembly 10 will appear exactly as illustrated in Fig. 2 except that the belt 20 and the driving roll 51 therefor will occupy the positions shown in that figure for the belt 19 and the roll 49. Each of the auxiliary conveyor belts 19 and 20 is also trained at the opposite end thereof around an idler roll 52 having a shaft 53. The roll shafts 48—48 and 53—53 are rotatably mounted in a plurality of brackets 54—54, which are secured to and depend from the under surface of the turntable 16 as shown in Figs. 3 and 4.

It should be understood that, with the foregoing construction of the drive means 22 for the auxiliary conveyor belts 19 and 20, the belts 19 and 20 are continuously driven in opposite directions to each other at all times irrespective of any rotation imparted to the turntable shaft 17 by the turntable-rotating means 26. In practice, it is preferred to drive the auxiliary belts 19 and 20 substantially faster than the main belts 12 and 13 so that the articles 11—11 are quickly received on and discharged from the auxiliary belts and the entire transfer operation takes place in as short a time as possible.

In this manner, if two articles 11—11 are following each other closely on the first main conveyor belt 12, the first article 11 may be transferred to the second main conveyor belt 13 before the following article 11 has approached the turntable 16. In the event that the transfer operation is not quick enough to transfer successive articles, an additional pair of curved guard rails (not shown, but similar to the rails 28 and 29 mentioned previously) may be mounted at the outer periphery of the turntable 16 above the belt 19 and below the belt 20 so as to restrain a following article 11 on the belt 12 from passing onto the turntable 16 until such time as the rotation of the turntable has been completed.

The reason that it is preferred to rotate the turntable 16 in a clockwise direction, as viewed in Fig. 2, is that the bevel gears 41—41 are then revolved in a clockwise direction about the bevel gear 38 during the transfer operation. Since the gear 38 rotates continuously in a clockwise direction, as viewed in Fig. 2, the net rotation of the bevel gears 41—41 on their own axes to drive the conveyor belts 19 and 20 is greatly slowed or stopped entirely. Thus, the clockwise rotation of the turntable 16 during the transfer operation assists in retaining the articles 11—11 on the operative auxiliary belt; whereas, counterclockwise rotation of the turntable 16 would tend to speed up the auxiliary conveyor belts 19 and 20. In practice, it is preferred to rotate the turntable 16 as quickly as possible, and the auxiliary belts are substantially stopped during the rotation of the turntable.

The means 26 for rotating the turntable 16 includes an air cylinder 56 mounted on the platform 32 and normally positioned with its piston rod 57 in a fully retracted position to the left as viewed in Fig. 4. When it is desired to rotate the turntable 180°, a solenoid valve 58 (Fig. 5) is actuated to supply compressed air to the left end of the cylinder 56, as viewed in Fig. 4, to move the piston rod 57 and a rack 59 connected thereto from left to right.

The rack 59 meshes with a pinion 61 that is keyed to a stub shaft 62 which is in turn mounted in a bearing 63 to the platform 32. The pinion 61 rotates the turntable shaft 17 in a clockwise direction, as viewed in Fig. 2, during the forward stroke of the cylinder 56 through a suitable one-way clutch, designated generally by the numeral 64, which may conveniently be of the ratchet type. A solenoid valve 66 (Fig. 5) is provided for admitting compressed air to the right end of the air cylinder 56 so as to return the rack 59 to the normal position illustrated in Fig. 4. During the return stroke of the rack 59, the turntable shaft 17 does not rotate because of the one-way clutch 64.

The switching means 27, for initiating the operation of the turntable-rotating means 26 when an article 11 is present on the operative auxiliary conveyor belt 19 or 20, includes a switch designated generally by the numeral 67 and having an actuator plunger 68 disposed in the path traversed by an article 11 on one of the auxiliary belts. A normally open contact 69 (Fig. 5) of the switch 67 is closed each time an article 11 passes onto one of the auxiliary belts 19 or 20 and engages the plunger 68. As best illustrated in Fig. 4, the plunger 68 is slidably received through an aperture in the guard rail 28 so as to be engageable by the articles 11—11.

As viewed in Fig. 5, the momentary closure of the contact 69 by an article 11 is effective to energize an operating relay 71 across a pair of supply conductors 72—72 through a normally closed contact 73 of a switch designated generally by the numeral 74. The relay 71 latches in due to the closure of a normally open holding contact 76 thereof, so that the relay 71 remains energized even though the contact 69 of the switch 67 reopens a short time after the turntable 16 has started rotating. The relay 71 also closes a normally open contact 77 thereof, which is effective to energize the solenoid valve 58 across the conductors 72—72 to initiate the rotation of the turntable 16.

When the air cylinder 56 has completed its operating stroke to the right, as viewed in Fig. 4, an actuator 78 carried by the rack 59 strikes a plunger 79 of the switch 74, which momentarily opens the contact 73 thereof (Fig. 5) to de-energize the operating relay 71. When this occurs, the normally open contact 77 is reopened to de-energize the solenoid valve 58 and a normally closed contact 81 thereof is reclosed so as to energize the solenoid valve 66 across the conductors 72—72 to return the rack 59 to the leftward position illustrated in Fig. 4 in preparation for the next transfer operation.

While one specific embodiment of the invention has been described in detail hereinabove, it will be obvious that various modifications may be made from the specific details described without departing from the spirit and scope of the invention.

What is claimed is:

1. Apparatus for automatically transferring a succession of articles from a first main conveyor belt to a second main conveyor belt mounted parallel to the first and running in the opposite direction thereto, which comprises a normally stationary turntable mounted adjacent to both the discharge end of the first main conveyor belt and the receiving end of the second main conveyor belt, a pair of auxiliary conveyor belts mounted symmetrically on said turntable one in alignment with each of the main conveyor belts, means for driving said auxiliary conveyor belts continuously so that the upper runs thereof travel in the same directions as the upper runs of the main conveyor belts aligned therewith whereby an article travelling along the first main conveyor belt passes onto a first one of said auxiliary conveyor belts on said turntable, and means responsive to the presence of an article on the first auxiliary conveyor belt for rotating said turntable through an angle of 180° so that the first auxiliary conveyor belt aligns with the second main conveyor belt and the article travels therefrom onto the second main conveyor belt, the other auxiliary conveyor belt being then aligned with the first main conveyor belt so as to receive the next successive article.

2. The apparatus as recited in claim 1, wherein the turntable is secured on a shaft and wherein the driving means for the auxiliary conveyor belts comprises an annular bevel gear that is journalled for free rotation about the turntable shaft, a motor designed for rotating said annular bevel gear continuously, a pair of secondary bevel gears meshing with said annular bevel gear on opposite sides of the turntable shaft, a pin secured to the turntable shaft and having opposite ends projecting outward therefrom on which said secondary bevel gears are rotatably mounted, and a pair of drive linkages driven by said secondary bevel gears and driving the auxiliary conveyor belts in opposite directions to each other.

3. The apparatus as recited in claim 2, wherein the turntable-rotating means is designed to rotate the turntable shaft 180° in the same direction each time an article is to be transferred; and wherein that direction is so arranged that, as the turntable rotates, the secondary bevel gears travel around the annular bevel gear in a direction designed to reduce the speeds of the auxiliary conveyor belts.

4. Apparatus for automatically transferring a succession of articles from a first main conveyor belt to a second main conveyor belt mounted parallel to the first and running in the opposite direction thereto, which comprises a supporting table, a normally stationary turntable mounted within said supporting table adjacent to both the discharge end of the first main conveyor belt and the receiving end of the second main conveyor belt, a pair of auxiliary conveyor belts mounted symmetritally on said turntable one in alignment with each of the main conveyor belts, means for driving said auxiliary conveyor belts continuously so that the upper runs thereof travel in the same directions as the upper runs of the main conveyor belts aligned therewith whereby an article travelling along the first main conveyor belt passes onto a first one of said auxiliary conveyor belts on said turntable, a switch mounted on said supporting table and having an actuator disposed in the path traversed by an article on the first auxiliary conveyor belt so that the switch is actuated by the article after it has been completely received on the first auxiliary conveyor belt, and drive means set in motion by the actuation of said switch for rotating said turntable through an angle of 180° so that the first auxiliary conveyor belt aligns with the second main conveyor belt and the article travels therefrom onto the second main conveyor belt, the other auxiliary conveyor belt being then aligned with the first main conveyor belt so as to receive the next successive article.

5. The apparatus as recited in claim 4, wherein the turntable-rotating means comprises a turntable shaft, a fluid cylinder having a piston rod, a rack secured to the piston rod for movement therewith, a pinion meshing with said rack, a stub shaft on which said pinion is mounted for rotational movement therewith, a one-way clutch connecting said stub shaft to said turntable shaft only on a forward stroke of said fluid cylinder, the article actuated switch being arranged to initiate the forward stroke, and switching means operated after the transfer operation for initiating a return stroke of said fluid cylinder.

6. Apparatus for automatically transferring a succession of articles from a first main conveyor belt to a second main conveyor belt mounted parallel to the first and running in the opposite direction thereto, which comprises a supporting table, a normally stationary turntable mounted within said supporting table adjacent to both the discharge end of the first main conveyor belt and the receiving end of the second main conveyor belt, a pair of auxiliary conveyor belts mounted symmetrically on said turntable one in alignment with each of the main conveyor belts, means for driving said auxiliary conveyor belts continuously so that the upper runs thereof travel in the same directions as the upper runs of the main conveyor belts aligned therewith whereby an article travelling along the first main conveyor belt passes onto a first one of said auxiliary conveyor belts on said turntable, means responsive to the presence of an article on the first auxiliary conveyor belt for rotating said turntable through an angle of 180° so that the first auxiliary conveyor belt aligns with the second main conveyor belt and the article travels therefrom onto the second main conveyor belt, the other auxiliary conveyor belt being then aligned with the first main conveyor belt so as to receive the next successive article, and at least one arcuate guard rail projecting upward from said supporting table adjacent to portions of the outer periphery of said turntable so as to abut the articles and retain them on the auxiliary conveyor belts until those belts have been moved into alignment with the second main conveyor belt.

7. Apparatus for automatically transferring a succession of articles from a first main conveyor belt to a second main conveyor belt mounted parallel to the first and running in the opposite direction thereto, which comprises a supporting table, a normally stationary turntable mounted within said supporting table adjacent to both the discharge end of the first main conveyor belt and the receiving end of the second main conveyor belt, a pair of auxiliary conveyor belts mounted symmetrically on said turntable one in alignment with each of the main conveyor belts, means for driving said auxiliary conveyor belts continuously so that the upper runs thereof travel in the same directions as the upper runs of the main conveyor belts aligned therewith at a substantially greater speed whereby an article travelling along the first main conveyor belt passes quickly onto a first one of said auxiliary conveyor belts on said turntable, a switch mounted on said supporting table and having an actuator disposed in the path traversed by an article on the first auxiliary conveyor belt so that the switch is actuated by the article after it has been completely received on the first auxiliary conveyor belt, drive means set in motion by the actuation of said switch for rotating said turntable through an angle of 180° so that the first auxiliary conveyor belt aligns with the second main conveyor belt and the article travels therefrom onto the second main conveyor belt, the other auxiliary conveyor belt being then aligned with the first main conveyor belt so as to receive the next successive article, and at least one arcuate guard rail projecting upward from said supporting table adjacent to portions of the outer periphery of said turntable so as to abut the articles and retain them on the auxiliary conveyor belts until those belts have been moved into alignment with the second main conveyor belt.

References Cited in the file of this patent

UNITED STATES PATENTS

| | | |
|---|---|---|
| 1,967,761 | Von Reis | July 24, 1934 |
| 2,848,100 | Jasper | Aug. 19, 1958 |